July 8, 1941.   H. E. NOBIRON   2,248,280
MACHINE FOR HEATING METAL BARS AND TUBES
Filed July 27, 1939   13 Sheets-Sheet 3

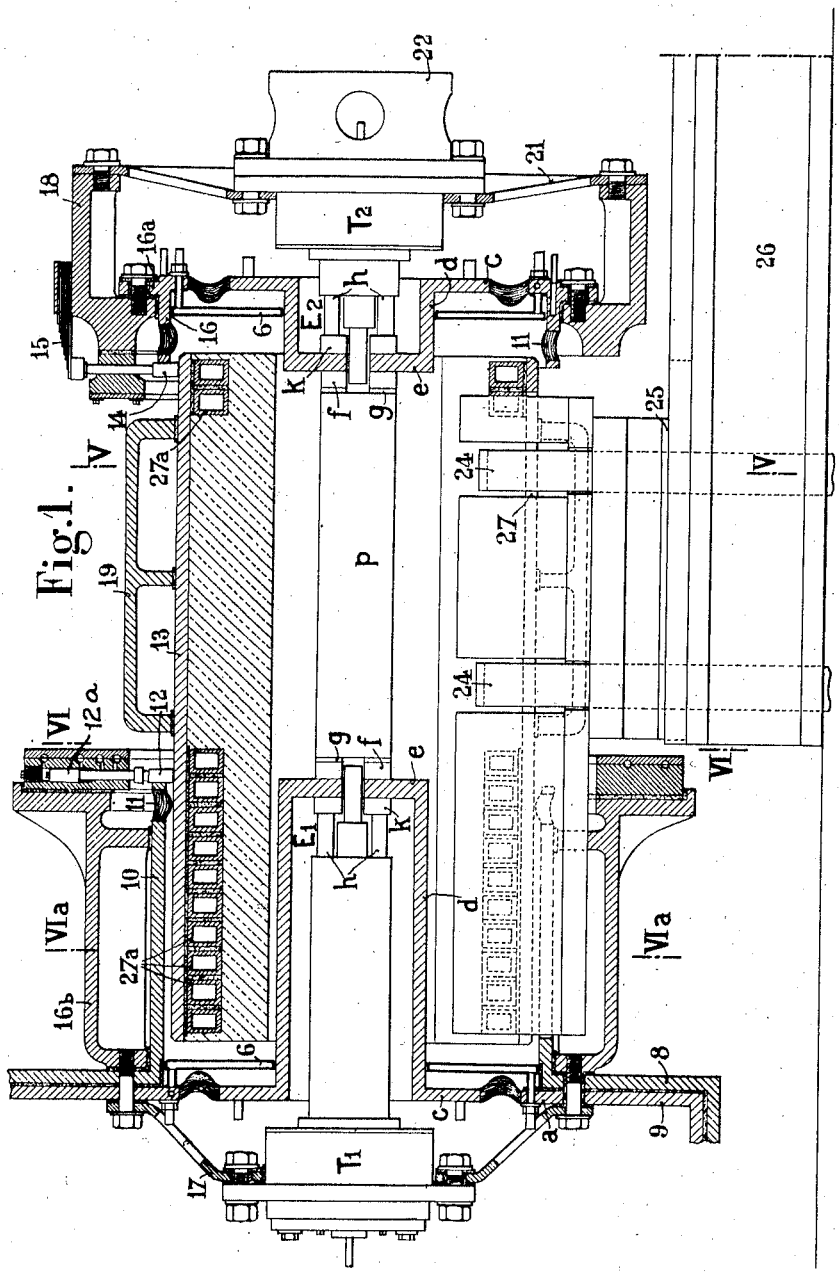

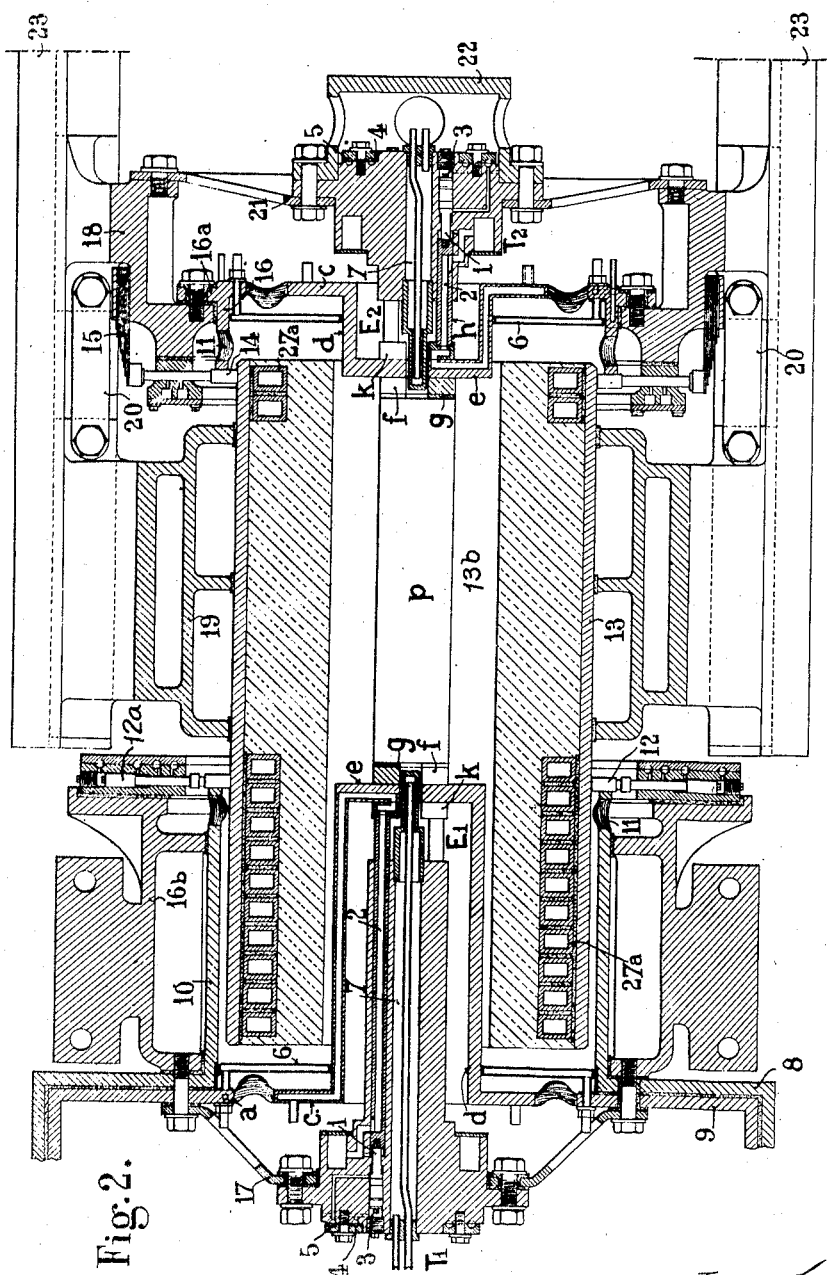

HENRI EDWARD NOBIRON, DECEASED
BY MARIE LOUISE NOBIRON NEE GUILLON HEIR AT LAW
Inventor,
By: Glascock Downing & Seebold
Attys.

July 8, 1941. H. E. NOBIRON 2,248,280
MACHINE FOR HEATING METAL BARS AND TUBES
Filed July 27, 1939  13 Sheets-Sheet 4

Inventor,
HENRI EDWARD NOBIRON, DECEASED
BY MARIE LOUISE NOBIRON NEE GUILLON HEIR AT LAW
By: Glascock Downing & Seebold
Attys.

July 8, 1941.  H. E. NOBIRON  2,248,280
MACHINE FOR HEATING METAL BARS AND TUBES
Filed July 27, 1939  13 Sheets-Sheet 5
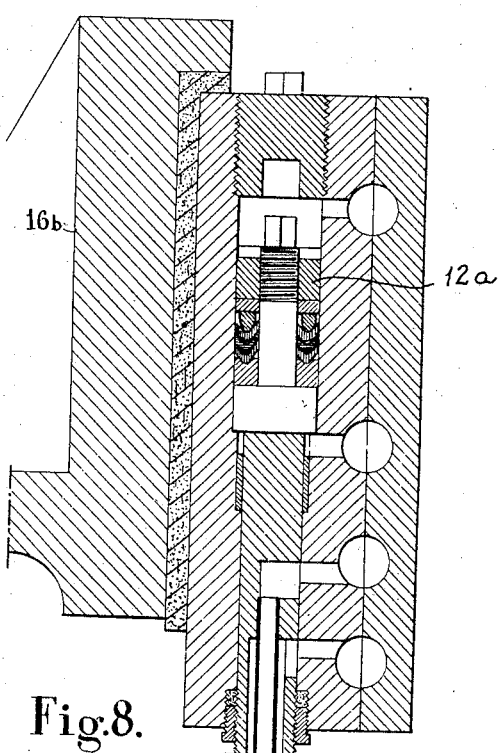
Fig.8.
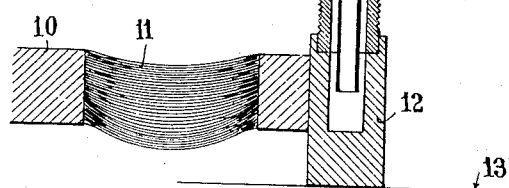
Fig.9.  Fig.10.
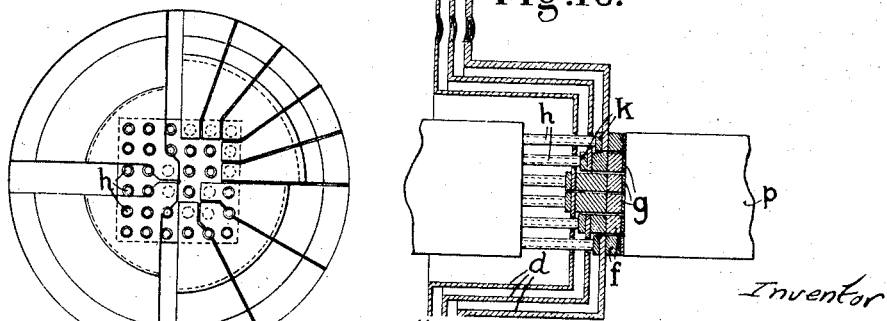
Inventor
HENRI EDWARD NOBIRON, DECEASED
BY MARIE LOUISE NOBIRON NEE GUILLON HEIR AT LAW
By: Glascock Downing & Seebold
Attys.

July 8, 1941.  H. E. NOBIRON  2,248,280
MACHINE FOR HEATING METAL BARS AND TUBES
Filed July 27, 1939  13 Sheets-Sheet 7

Inventor
HENRI EDWARD NOBIRON DECEASED
BY MARIE LOUISE NOBIRON NEE GUILLON HEIR AT LAW By: Glascock Downing Seebold
Attys.

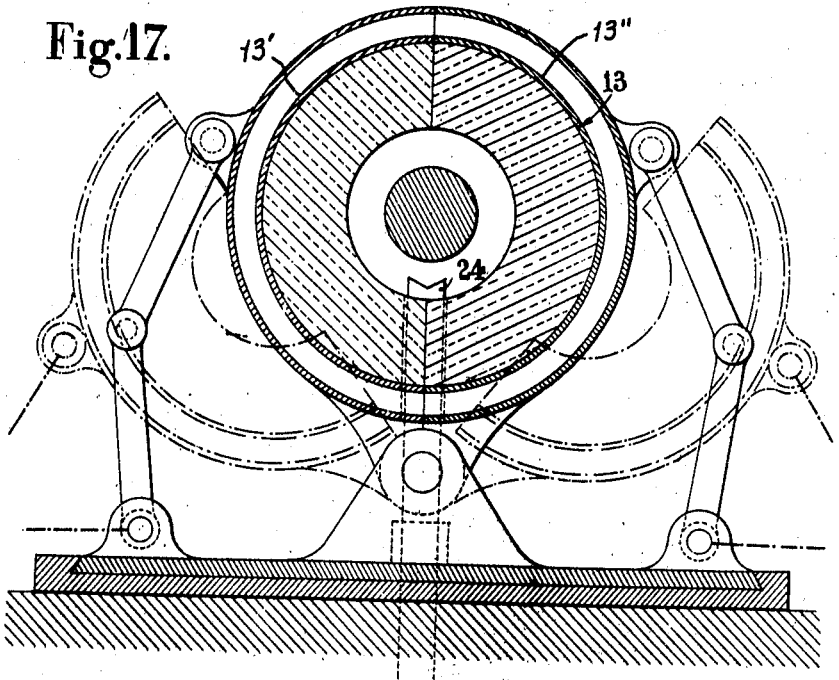
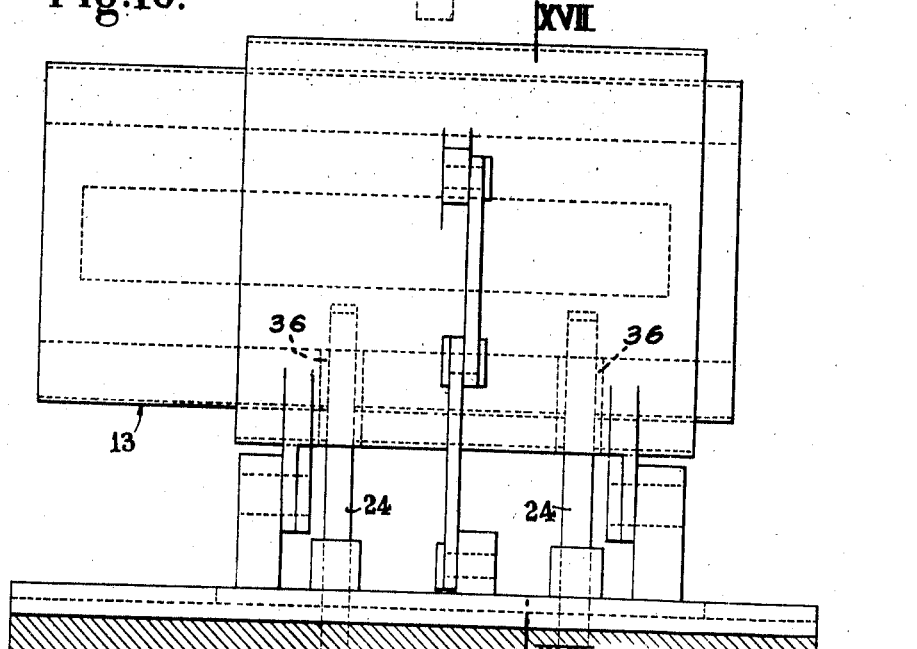

July 8, 1941.　　　H. E. NOBIRON　　　2,248,280
MACHINE FOR HEATING METAL BARS AND TUBES
Filed July 27, 1939　　13 Sheets-Sheet 9

Inventor:
HENRI EDWARD NOBIRON, DECEASED
BY MARIE LOUISE NOBIRON NEE GUILLON, HEIR AT LAW Inventor,
HENRI EDWARD NOBIRON, DECEASED
BY MARIE LOUISE NOBIRON, NEE GUILLON HEIR AT LAW
by: Glascock Downing & Seebold
Attys.

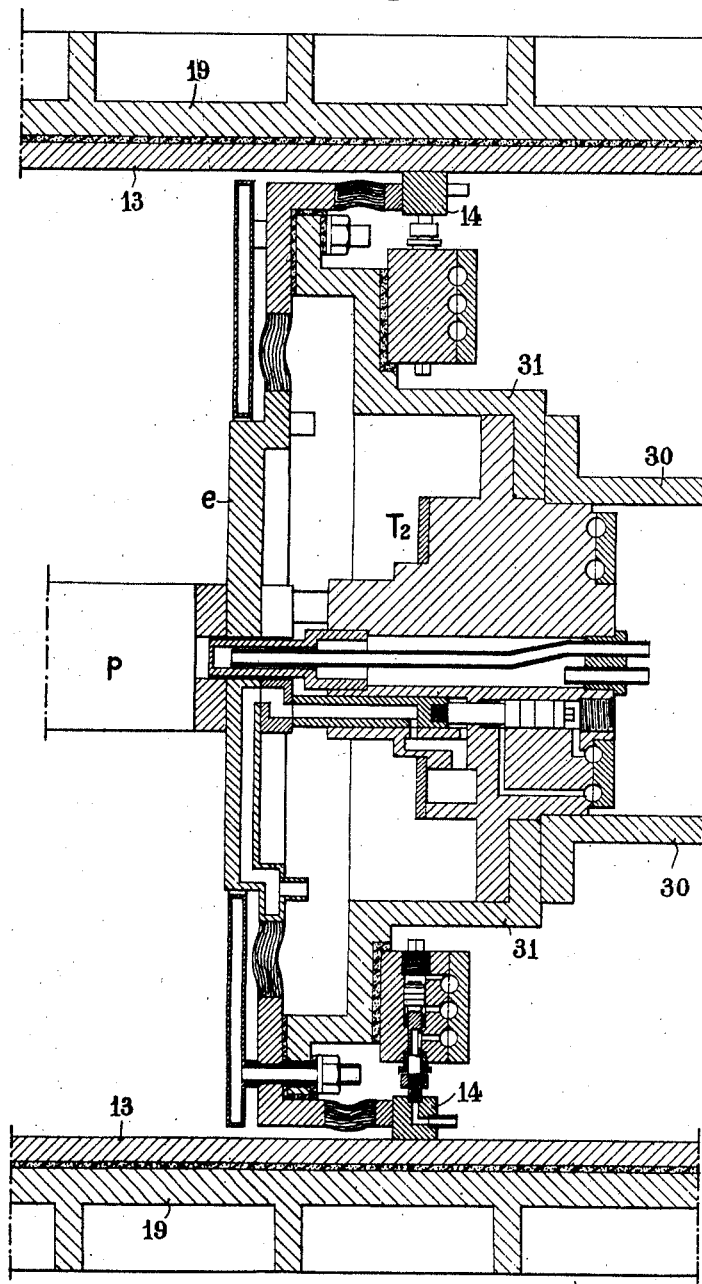

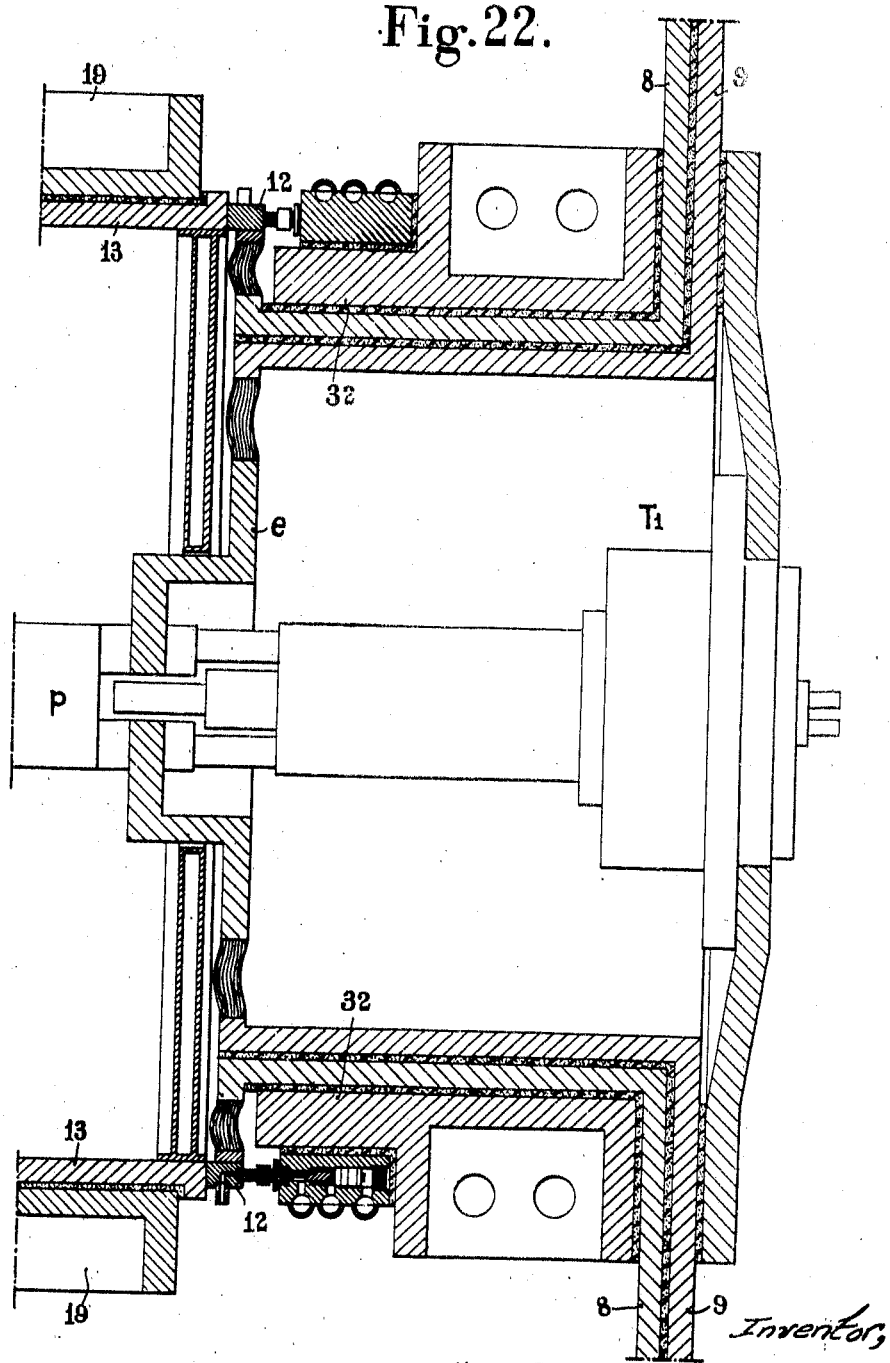

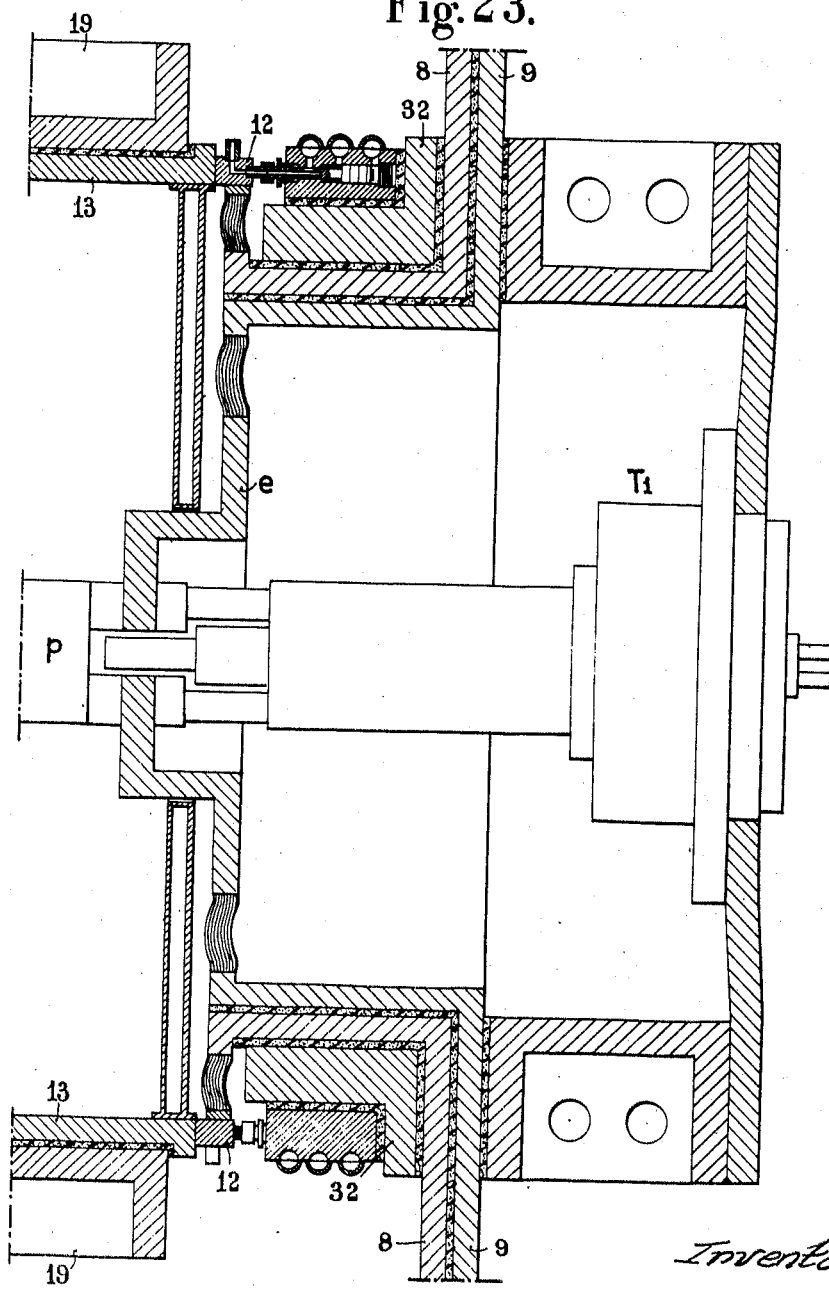

Patented July 8, 1941

2,248,280

UNITED STATES PATENT OFFICE 2,248,280

MACHINE FOR HEATING METAL BARS AND TUBES

Henri Edward Nobiron, deceased, late of Les Sables d'Olonnes, France, by Marie Louise Nobiron, née Guillon, Les Sables d'Olonnes, France, heir at law, assignor to Société Anonyme Louvroil, Montbard, Aulnoye, Paris, France, a French society Application July 27, 1939, Serial No. 286,943
In France July 27, 1938

6 Claims. (Cl. 219—11)

The present invention relates to a machine for heating metal bars and tubes, in particular steel bars and tubes of all grades, by the use of the Joule effect produced by the direct passage through said members of an electric current which is led thereto by electrodes.

To this machine is applied the electrode system for heating metal members forming the subject-matter of the French Patent No. 841,354, dated January 19, 1938, in the name of the Société Anonyme "Louvroil, Montbard, Aulnoye."

This electrode system is moreover appreciably modified and improved, particularly with a view of using alternating currents of high intensity at industrial frequencies.

Consequently, the electrodes of the present machine are in accordance with all the principles and are provided with the devices set forth in said patent, namely:

They comprise a certain number of contact elements separately connected by means of flexible connections to current supply members secured in a common support, said flexible connections allowing said elements to move relatively to each other in a direction normal to the surface of contact with the member to be heated, in opposition to a thrust exerted on each of them by a spring or by a fluid under pressure;

The contact elements and the current supply members are individually cooled by the circulation of a cooling fluid;

Their end coming in contact with the member to be heated is lined with a member made of metal which is a good conductor of heat and of electricity and capable of withstanding high temperatures for a long period;

Between these end members and the copper blocks on which are brazed or welded the flexible connections, are interposed "intermediate" members in contact with the cooling fluid and made of a metal the electric and heat conductivities of which are suitably chosen.

It may happen in certain special cases that the final temperature of the member is not desired to be the same at one end or at both ends as in the body of the member. The suitable choice of the "intermediate metal" and the intensity of the cooling may give this result to a certain extent.

The electrodes of the machine forming the subject-matter of the present invention have the following improvements:

In order to use high intensities of alternating current, the copper conductors leading the current to the elements of the electrode are no longer, as in the previous patent, united in a compact block, but are arranged according to the segments of one or more hollow and concentric cylinders.

Several forms of carrying out the subject-matter of the invention will be described with references to the accompanying drawings by way of example, in which:

Fig. 1 is a vertical axial section of a first embodiment.

Fig. 2 is a horizontal axial section of the same apparatus.

Fig. 8 shows, in section and on an enlarged scale, one of the brushes.

Fig. 9 is a cross section of a form of construction of an electrode composed of several series of elements the shells of which are segments of concentric cylinders.

Fig. 10 is a vertical section through Fig. 9.

Fig. 16 is a side elevation of another modification.

Fig. 17 is a cross section made according to line XVII—XVII of Fig. 16.

Figs. 21 to 23 are partial axial sections of three other modifications.

Figure 3:
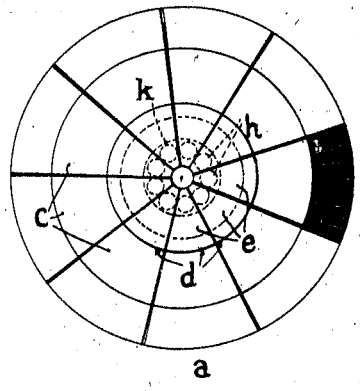
Fig. 3 is an end view of an electrode having nine elements.
Figure 4:
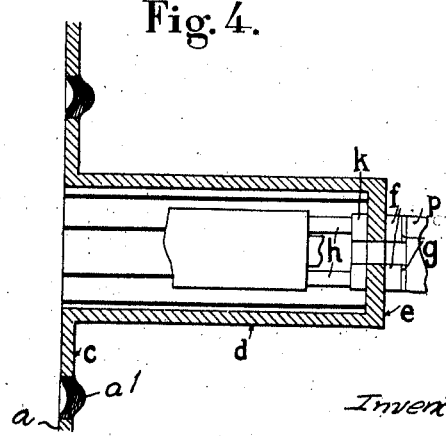
Fig. 4 is a vertical section of said electrode.
Figure 7:
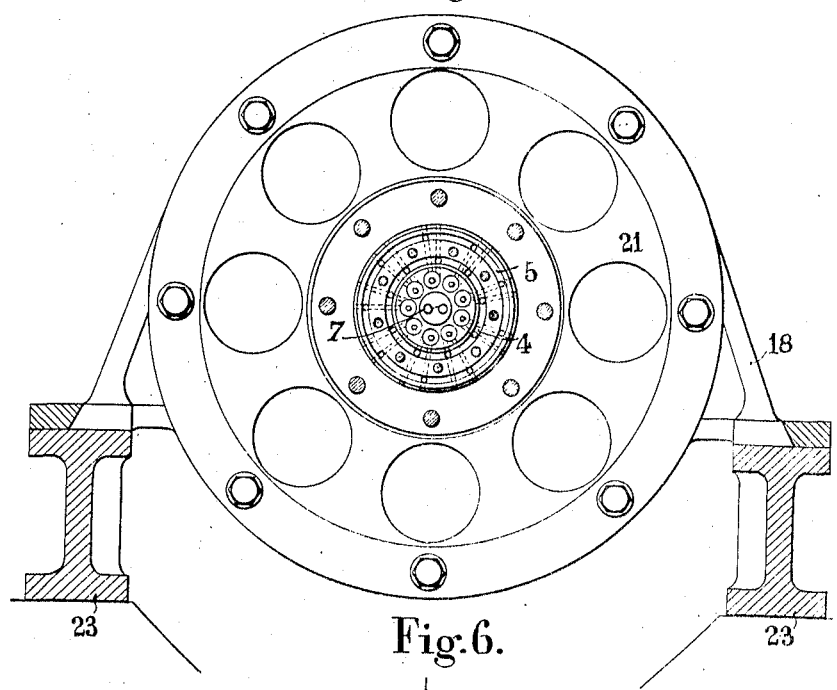
Fig. 7 is an end view of the movable head of the same apparatus.

In Figs. 3-4 it will be seen that the red copper disc $a$ leads the current to the elements $c$, $d$, $e$. Each element is connected to said disc by a flexible conductor formed for instance of red copper foils $a_1$ welded together by oxy-acetylene welding at their ends and then welded or brazed, on the one hand to the disc $a$ and, on the other hand, to the copper members $c$ of the elements. The thickness of the foils is chosen in order to allow the desirable flexibility.

The flexible conductors of these new electrodes are arranged in such a manner that the flexibility is used in the direction at right angles to their length instead of being used in the direction of the length as in the first electrodes. This arrangement allows a much more important displacement.

The conductors $d$ are arranged in the case of Figs. 3-4 according to 9 segments forming "shells," geometrically obtained by cutting a hollow red copper cylinder according to planes passing through its axis. They are continued by segments e forming a plane disc at right angles to the axis of the cylinder d, which coincides with the axis of the member p to be heated and that of the machine.

Consequently, in this example, 9 red copper "shells" cde are obtained. On the part e of each element are welded or brazed, on one side, the "contact block" comprising the "intermediate metal" f and the direct contact member g applied on the member to be heated p, and, on the other side, a metal member k forming a bearing on the electrode for the piston h ensuring the individual pressure of the electrode element.

Fig. 2 shows how the cooling of the element can be effected.

In Figs. 1 to 8 will also be seen then the manner in which the pressure is applied. In the prior patent above mentioned the drawings showed that the pressure was ensured by Belleville washers, and the description specified that it could also be obtained by any hydraulic, mechanical or electromagnetic process. In the accompanying drawings, by way of example, said pressure is produced by hydraulic pistons.

1 designates one of these pistons which transmits the pressure to the tube 2 which serves at the same time to convey a cooling fluid.

The hydraulic cylinders 3 communicate together by means of annular channels 4 and 5. These annular channels can be connected to a source of water or oil under a suitable pressure, which allows of controlling at will the forward or backward movement of the pistons; or they can be disconnected from any external pressure source and solely serve to connect together the hydraulic cylinders 3. In this latter case, the unit composed of said hydraulic cylinders acts as a differential system transmitting the pressure from one piston of an electrode element to the other pistons, which ensures the clamping of all the blocks on the member to be heated by maintaining thereon pressures which are exactly equal to each other. In this latter embodiment, the hydraulic cylinders 3 can be connected intermittently to a source or to an accumulator for the fluid under pressure for compensating leakages.

The total pressure of the electrodes on the member to be heated is ensured by a hydraulic piston (not shown) or by any other means outside the machine.

In Figs. 1, 2 is shown the manner in which the flexible conductors of the electrodes can be protected against heat radiation by screens 6 made of nonmagnetic metal and of high electric resistance through which passes a stream of cooling fluid.

A cooling device 7 can also be placed in certain cases in the centre of the electrode for checking the radiation when the central part of the end of the heated member p is not occupied by the electrode blocks. This will always be the case when heating tubes.

When the cross section of the member p exceeds a certain size it may be necessary to multiply the number of electrode elements and it may be advantageous to arrange the "shells" d on one or more concentric cylinders.

Figs. 9 and 10 illustrate an electrode divided into 36 elements the blocks of which are distributed on the end face of a bar of square cross section. The shells form three hollow concentric cylinders d. The whole structure must be devised by taking into account the resistances of the circuits in parallel and particularly of the skin effect, if alternating currents are under consideration.

If the thickness of the copper constituting the shells is too small for forming cooling channels therein, the latter can be constituted by half-cylinders having a circular or rectangular cross section, welded to the inner face of the shells. These half-cylinders will be constituted by thin metal of high electric resistance and completely non-magnetic if they are placed in the magnetic flux.

For very high intensities it may happen that it is advantageous to use alternating currents of a frequency lower than the usual 50 periods.

The general arrangement of the heating machine is the following:

The electric current is supplied by two parallel red copper discs 8 and 9 having the same axis as the machine.

The inner disc 8 forms a unit with a tube 10 made of red copper and so-called "brush-carrying tube."

On the end section of this tube are welded flexible connections 11 made of red copper foil welded on the other hand to red copper brushes 12. These brushes form a circular crown and are firmly pressed on the outer surface of a hollow red copper cylinder 13, so-called "main cylinder."

The unit composed of the brushes forms a contact member between the brush-carrying tubes and the main cylinder which is treated as an electrode each brush of which would constitute an element:

The number of brushes is as great as possible for reducing to the minimum the loss of energy at the contact. Each brush 12 is movable independently of the other in the direction at right angles to the surface of the cylinder. It receives its pressure independently. It is provided with a cooling system. The surface of contact with the cylinder can be constituted by a special metal improving the contact.

Figure 6:
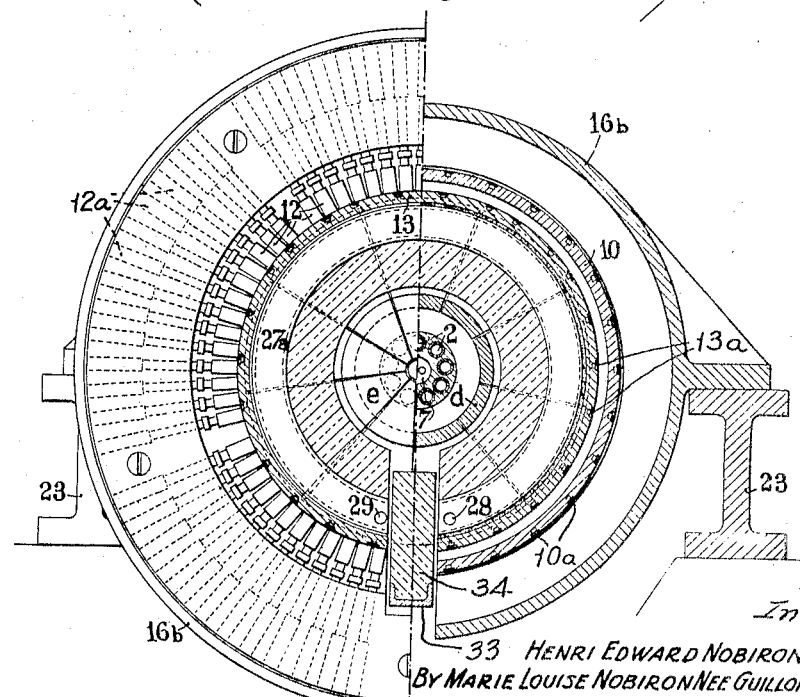
Fig. 6 shows two vertical half-sections made respectively according to lines VI—VI and VIa—VIa of Fig. 1.

Fig. 6 shows, at the left, a half-view of the ring of brushes 12. On said ring the pressure of the brushes has been obtained by means of a hydraulic piston 12a for each brush. But it can be ensured through the medium of springs or by any other means.

In Figs. 2 and 8 can be seen the hydraulic piston device and the device for cooling the brushes.

The "brush-carrying tube" 10 is itself cooled by means of channels 10a visible in the right-hand half-section of Fig. 6. These channels extend up to the block of flexible conductors which are thus cooled at both their ends.

Issuing from the brushes 12 the current follows the "main cylinder" 13 and reaches a second ring of brushes 14. (It will be seen that in certain cases one of the two rings of brushes can be done away with, or even both of them.)

This second ring of brushes is treated according to the same principles as the first one. In the drawings, it has been assumed that the pressure was produced by spring blades 15.

During the operations, it is necessary to control the lifting of the brushes 12, 14 and their application on the cylinder 13. With hydraulic pressure the brushes may be lifted by changing the pressure; when use is made of spring brushes as at 14 and 15, the lifting of all the brushes of the ring can take place for instance by means of a ratchet wheel (not shown), placed on the brush-carrying disc, concentric with the latter, and movable in an annular slideway. Each tooth of this ratchet wheel forms a cam which lifts a brush when the wheel rotates through a certain angle lower than the pitch of a tooth. It lowers it, when it returns to its initial position.

On the right where Fig. 2, side of the electrode E2, is located will be seen how the cooling of said brushes 14 is effected.

The brushes 14 are connected, by a flexible connection 11 made of foil, to a second brush-carrying tube 16 forming one piece with a red copper disc 16a.

It is on this disc 16a that the flexible connections of the elements of the electrode E2 are welded.

The current is admitted, through said electrode to the heated bar or tube p, from which it issues through the other electrode E1, connected by shells cde and flexible connections $a_1$ to the current supply disc 9.

The arrangement thus adopted for the path of the current allows of reducing to the minimum the reactive energy, as the only existing magnetic field is that which occupies the annular space comprised between the brush-carrying tubes 16 and the main cylinder 13 on the one hand and between the bar p and the electrodes on the other hand.

It allows of judiciously choosing the diameters of the cylinders, brush-carrying tubes, electrodes, in order to obtain everywhere admissible intensities of current, without exaggerating the importance of the reactive power and whilst utilising to the best advantage the cross section of the copper, Foucault currents and skin effect being taken into account.

The path of the lines of force of the magnetic field being well known, it is very easy to calculate the reactive powers and the Foucault currents.

The cooling of all the members is effected easily and as perfectly as desired. The insulation of the electric conductors is easy. The machine is well protected.

The current is led to the discs 8 and 9 by pairs of bars of different polarities extending to the mains or to the transformer. The intensity of the current in said bars can thus be reduced to the value desired, and the prejudicial effects of Foucault currents, of the skin effect and of the reactive power, can be eliminated.

On the other hand, as it is necessary to cause the electrodes to effect longitudinal displacements, the arrangement adopted has the very important advantage of eliminating any flexible conductor of large cross section. There remains, as flexible conductors, only the connections of the brushes 12, 14 and of the electrode elements cde.

The loss of energy at the contact of the brushes can be rendered very slight and can be reduced to any practically desirable value.

For very high intensities, it may moreover be necessary to double or to multiply each ring of brushes for increasing the number of the same in order to reduce the loss at contact. This loss is, in fact, for a given total current and for a given pressure, in inverse ratio to the number of brushes. In this multiplication of the lines of brushes it is necessary to take into account the Foucault currents and the skin effect in the same way as indicated above for electrodes having multiple shells.

As the length of the bars p to be heated varies within certain given limits, it is necessary that the distance between the electrodes should be variable. This is obtained by the longitudinal displacement of the main cylinder 13 relatively to one or to the other of the electrodes E1, E2 or to both, owing to the two rings of brushes 12, 14, each ring being rigid with an electrode.

In Fig. 2, is shown the horizontal section of the framework 16b of the electrode E1. Said framework in the case illustrated, is fixed, and bolted on the base frame 26 of the machine.

On said framework 16b are bolted in overhanging position, on the one hand, the two discs 8 and 9 leading in the current and, on the other hand, the cheek member 17 carrying the head T1 of the electrode E1.

The head T1 and both discs 8 and 9 are thus in overhanging position and are perfectly accessible for the inspection of the head and for effecting the connections between the mains, or transformer and the discs.

In Fig. 2 will also be seen a part of the framework 19 of the main cylinder, as well as the section of the framework 18 of the electrode E2 on which is secured the cheek member 21 carrying the head T2 of said electrode.

Said head T2 is covered with a cap 22 which can receive the total pressure to be exerted on the electrodes and the reciprocating movement of T2 and this, by any hydraulic or mechanical means which is considered the most suitable in each case.

The framework 18 can slide on slideways 23 which are arranged as the bed of a lathe.

The framework 19 of the main cylinder can also slide on the same slideways 23.

It will be explained hereinafter that in certain cases it is necessary to render the frameworks 18 and 19 rigid together. This arrangement is illustrated in Fig. 2 by the use of connecting rods 20.

The main cylinder is internally lined with heat insulating refractory material 13b for reducing to the minimum the losses by radiation.

In the machine illustrated in Figs. 1 to 8, it has been assumed that the operations take place as follows:

The framework of the cylinder is rigid with that of the head T2 and the whole structure can slide on the slideways 23. Supporting fingers 24 (Figs. 1 and 5) are carried by the frame 25 which can slide on the slideways 26 parallel to the slideways 23.

The main cylinder 13 is provided at its lower part with a slot 27 through which the fingers 24 can penetrate into the cylinder until they come in contact with the bar p. Their end is cut out in V shape so as to receive said bar and hold it in equilibrium when the pressure of the electrodes ceases to hold the bar.

Said slot also allows a relative longitudinal displacement of the fingers 24 relatively to the cylinder.

The up and down movement of the fingers is ensured by any hydraulic, pneumatic or mechanical means the most suitable for each particular application of the machine.

Figure 5:
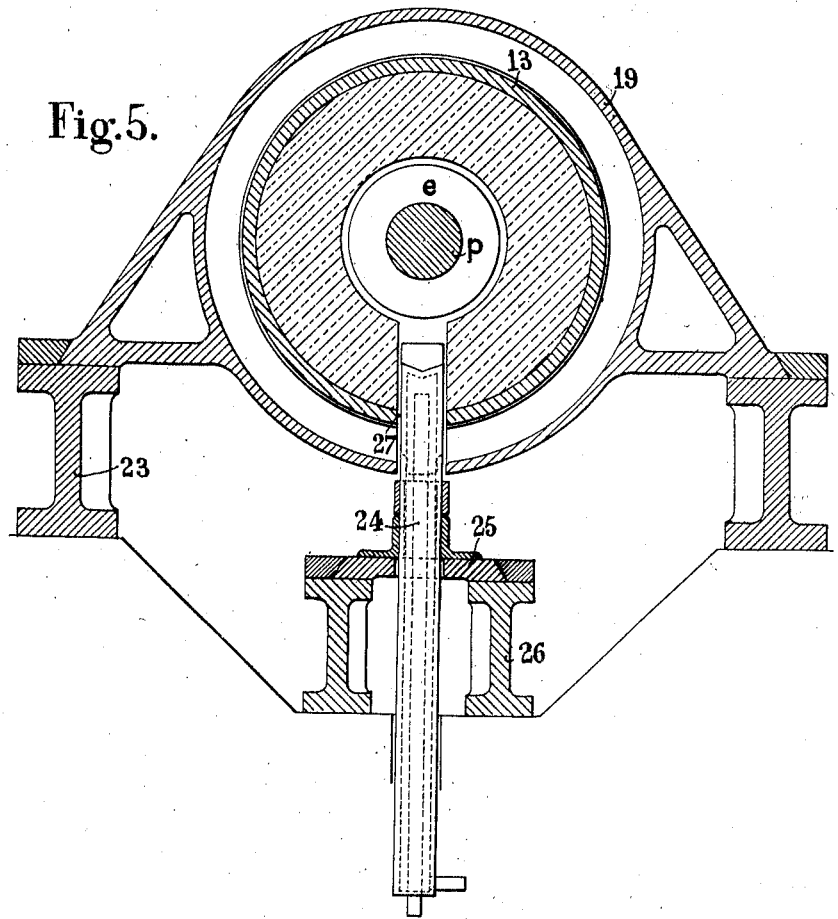
Fig. 5 is a vertical section made according to line V—V of Fig. 1, in which the device for lifting carrying fingers has not been illustrated.

The upper ends of the fingers are preferably made of nonmagnetic metal. The fingers are formed of tubes and are cooled as diagrammatically indicated in the drawings (Fig. 5).

In Fig. 6 will be seen a device for obturating the slot by means of a member 33 lined with refractory material 34 and rigid with the support for the fingers.

When a member p is being heated, the fingers 24 are lowered. The members being hot, they lift until they come in contact with the bar. At the same time the current is cut off. Then the brushes 12 of T1 are lifted and the unit T2 and the cylinder 13 slides towards the right so as to uncover the bar p.

The latter is ejected by a device not shown and a fresh cold bar comes on to the fingers 24. At this moment the unit composed of the cylinder 13 and T2 slides towards the left; the pressure on the member p is ensured at a suitable value by the electrodes and the device exerting a thrust on T2, then the brushes 12 press on the cylinder 13, the fingers 24 lower and the current is sent into the machine.

All these operations can be automatically controlled with great facility and only require a few seconds.

It is easy to adjust the temperature of the bar by means of a photo-electric cell and to arrange things in such a manner that said bar can issue only when its temperature has reached the determined value.

The whole structure of the machine is neat and compact, presents no danger of any kind and does not radiate heat to the exterior. All the materials, with the exception of the blocks of electrodes in direct contact with the bar and the refractory material of the cylinder are at a low temperature, which reduces the losses of energy to the minimum and ensures a practically indefinite life for the machine.

The main cylinder 13 being nearly entirely slotted and being subjected on the other hand to the pressure of the brushes 12, 14 which can reach a high value, it is necessary to reinforce it at the place where it is subjected to said pressure. This reinforcement is necessarily internal, as the brushes press on the outer surface.

For that purpose metal hoops 27a have been provided which are calculated to withstand the pressure of the brushes with a very slight flexure.

As said hoops are placed in the magnetic flux, they are made of a special nonmagnetic metal which is of high electric resistance.

The Foucault currents are reduced to a very low value.

The hoops can be very slightly insulated from the cylinder and from each other.

A stream of cooling water passes through them, which is supplied through the pipe 28 (Fig. 6) which feeds in parallel all the hoops on the side where the head T1 is located, the water issues through the pipe 29. Both pipes are parallel to the slot of the cylinder up to the framework. The presence of said pipes does not appreciably increase the Foucault currents. They must be made of metal which is nonmagnetic and of high resistance.

The two hoops arranged on the side where T2 is located can serve for supplying and returning the water for cooling the cylinder. In Fig. 6 are shown channels 13a for cooling the cylinder 13. Half of them can be connected in parallel to one hoop and the others in parallel to the other hoop.

It is to be understood that these detail arrangements are given only by way of example and numerous modifications can be made therein.

The drawings show the manner in which the machine is insulated:

In this example, it has been assumed that the head T2 is connected to the frame of the machine and to earth.

A machine arranged as just described can serve for heating members of extremely variable dimensions as well as regards their cross section as their length. Solid bars or tubes can be treated.

The length of the members can vary from a few centimeters to 15 meters and more.

The cross section can vary from a few square centimeters to several square decimeters. Said cross section can have any shape whatever.

For this reason, it is necessary to arrange the machine in a great number of different ways and the operations are also very variable according to the utilisation.

Figs. 11 to 20 diagrammatically illustrate some of the arrangements which can be adopted.

Figure 11:
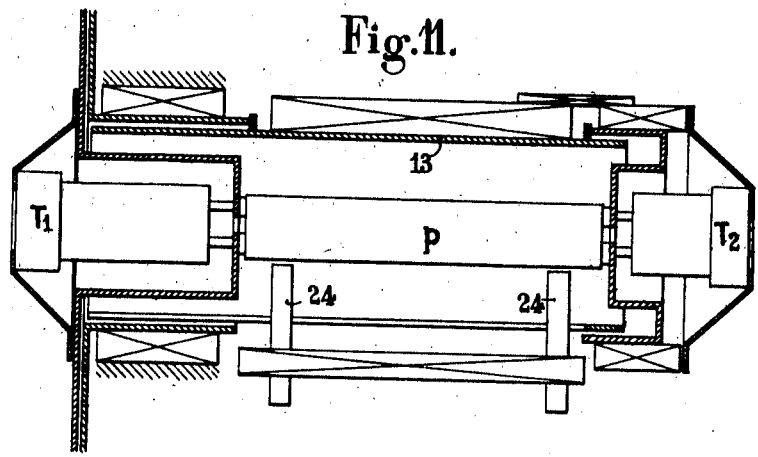
Figs. 11 to 15 are axial sections of five other forms of construction of the apparatus.

Fig. 11 shows a horizontal machine the cylinder of which is rigid with T2.

The longitudinal movement of the system of supporting fingers 24 is independent to a certain extent from that of T2.

The part of the cylinder serving to lengthen the machine is placed on the side where T1 is located.

The placing in position and the removal of the bar p are effected owing to the longitudinal displacement of the cylinder 13 which covers and uncovers the bar.

Figure 12:
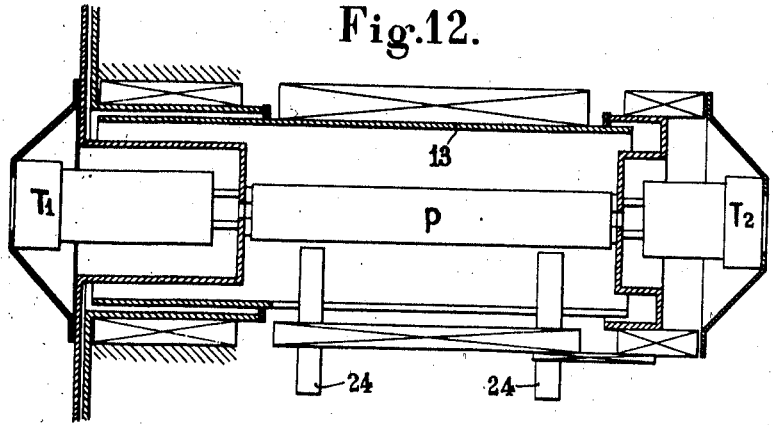

In the horizontal machines shown in Fig. 12, the finger system is rigid with T2.

The cylinder 13 has a certain longitudinal displacement according to the length of the bar p.

The bars are brought out of the cylinder 13 instead of the cylinder moving to uncover them.

The part of the cylinder serving to adjust the length of the machine according to that of the bars is placed on the side where T1 is located.

Figure 13:
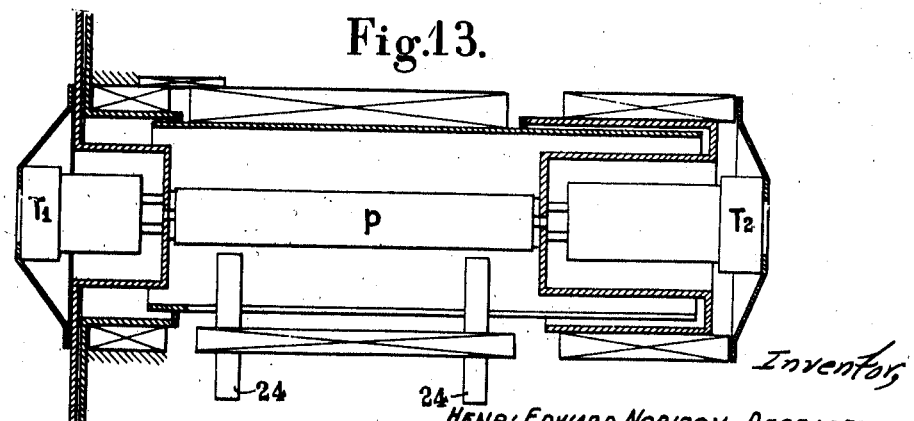

Fig. 13 illustrates another horizontal machine.

The framework of the cylinder is fixed, rigid with that of T1. The head T2 slides at the same time as the finger system for taking the bar out of the cylinder. The finger system can have a relative movement with respect to T2.

The part of the cylinder serving to adjust the length of the machine is placed on the side where T2 is located.

Figure 14:
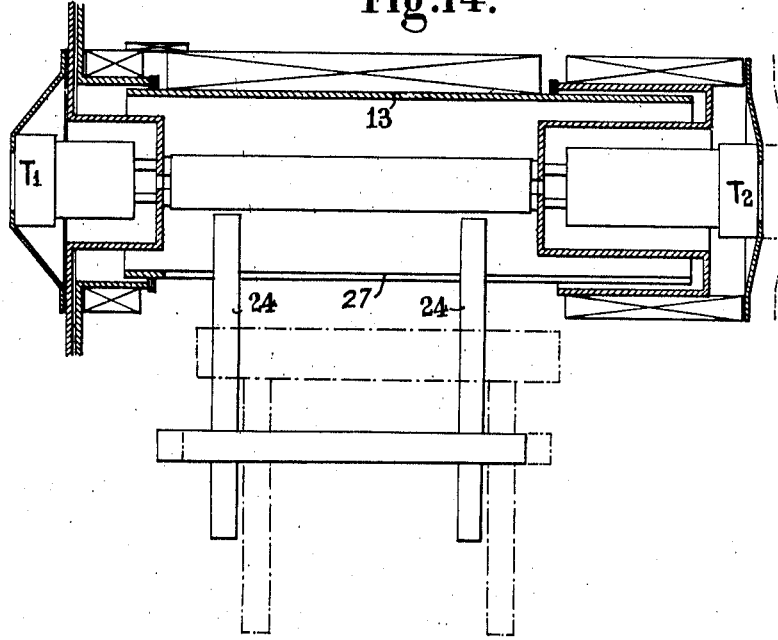

Another horizontal machine is shown in Fig. 14:

The framework of the cylinder is fixed, rigid with T1.

The lower slot 27 of the cylinder 13 is wide enough to allow the passage of the bar p. The amplitude of the sliding movement of T2 and of the fingers 24 is greatly reduced relatively to the above modifications, which improves compactness.

Figure 15:
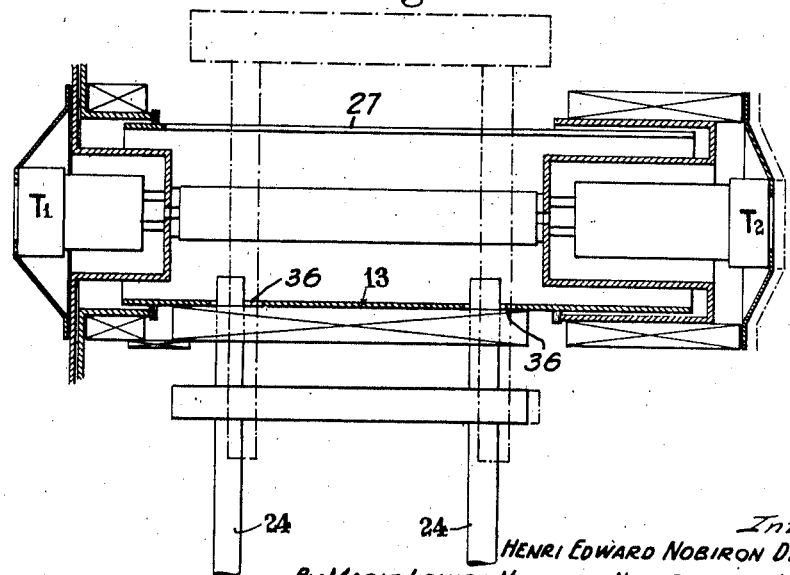

According to Fig. 15, the horizontal machine has the same arrangement as above, but whereas the lower part of the cylinder has only two reduced openings 36, its upper part comprises a slot 27 wide enough to allow the bar p to pass.

It is also possible, in this modification, that the bar, instead of being carried by fingers during the operation, is hung from the slot.

Figs. 16 and 17 illustrate a machine which can be horizontal or vertical.

The cylinder 13 moves longitudinally as well as T2 so as to be completely free of the rings of brushes (not shown).

It then opens into two shells 13', 13" which expose the bar p, the latter is supported by the fingers 24 the displacement of which is connected to that of the cylinder. The cylinder has only two reduced openings 36 at its lower part, for the passage of the fingers.

It is to be noted in this modification that both rings of brushes are necessary whereas in the others one of them can be done away with and replaced by fixed connections and the cylinder might even form a part, on one side, of the corresponding brush-carrying tube.

Instead of being placed on a lower slideway 39, the cylinder might be hung from a beam and open downwardly.

Instead of opening as a shell, the two half-cylinders might slide laterally.

Figure 18:
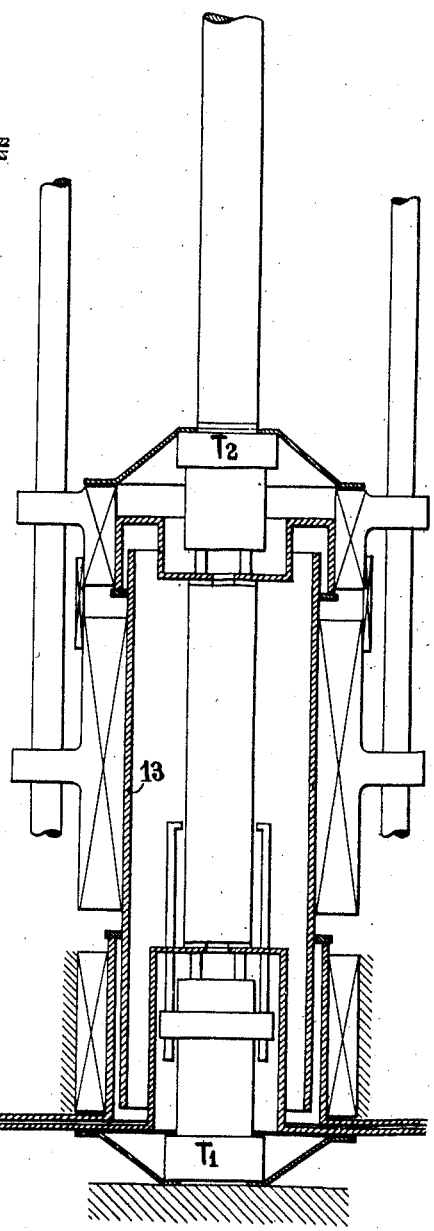

Fig. 18 shows a vertical machine:

Such an arrangement is preferred for heating short bars or if space is lacking in the horizontal plane;

The fixed head T1 is located at the bottom, the pressure is exerted from above;

The cylinder 13 acts as a bell.

It has no longitudinal slot, this giving an additional facility if members p are to be treated in a controlled atmosphere.

Figure 19:
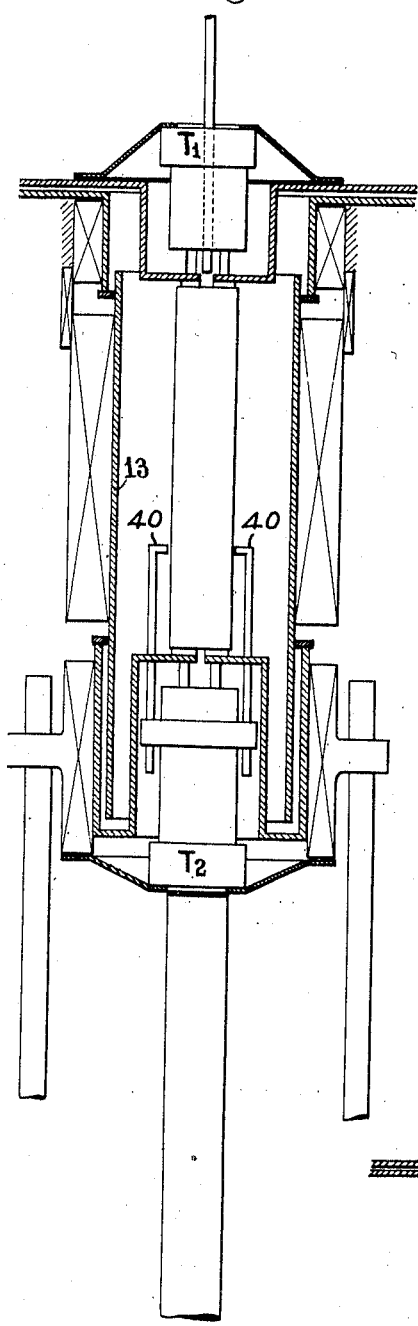
Figs. 18 to 20 show three other embodiments of the apparatus.

Another vertical machine is shown in Fig. 19;

The fixed head T1 is at the top, the movable head T2 withdraws through the bottom drawing the bar along with it.

In the two above mentioned modifications a collar or fork device 40 can be arranged which prevents the bar from turning over when the pressure of the electrodes ceases. If said device is to remain partly in the field during the heating, said part must be made of metal which is non magnetic and of high resistance. It will be formed of cooled tubes. A central vertical rod can also often be arranged which passes through the upper or lower electrode and serves to guide the heated member, more particularly, if said member is tubular.

In vertical machines, by way of modification, the member can be hung from the upper head instead of being carried by the lower electrode.

As above stated, it may be necessary, for the sake of simplicity or constructional economy, to do away with one ring of brushes in all the cases where there is no compulsory relative movement between said ring of brushes and the main cylinder. The pressure device is done away with at the same time as well as the lifting device and the corresponding flexible conductors. Then, screwed or welded connections will be provided on the cylinder and electrode disc or brush-carrying tubes or any other device equivalent as regards the quality of the contacts.

For instance, if the ring of brushes done away with is that of T2, the flexible connections of the elements of electrode E2 can be directly welded or connected to the main cylinder.

In certain cases, both rings of brushes can even be done away with. For instance in the modifications (Figs. 14 and 15) above described, if the length of the members to be heated does not vary within too wide limits, one of the two rings of brushes being done away with, the other can be replaced, or even both, by a system of flexible conductors of suitable length. These flexible conductors are then connected, on the one hand, to one end of the main cylinder and, on the other hand, to what replaces the corresponding brush-carrying tube.

Figure 20:
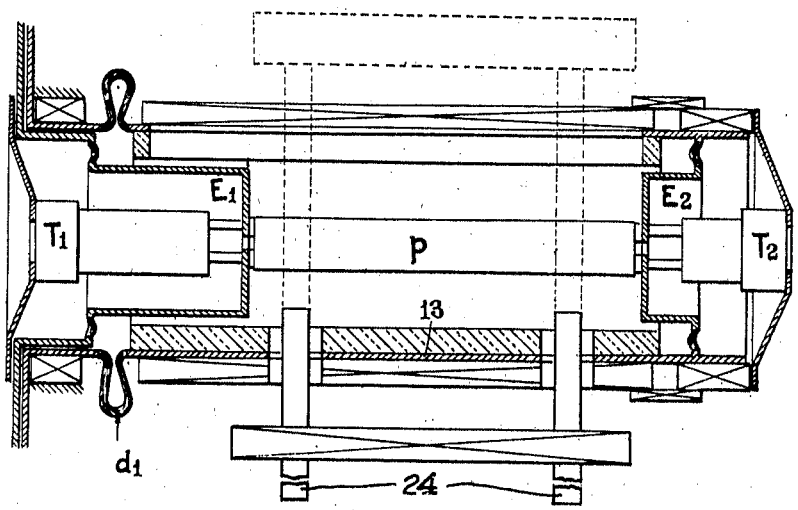

The diagram illustrated in Fig. 20 shows an example of this arrangement: The ring of brushes on the T2 side has been done away with by directly connecting to the main cylinder the flexible connections of the electrode E2, and the ring of brushes on the T1 side has been replaced by a ring of flexible conductors $d_1$.

T1 is fixed, T2 forms a unit with the main cylinder and slides longitudinally according to the length of the member heated. The system of supporting fingers can also slide for a certain distance.

The slot of the main cylinder through which the member heated is admitted and removed, can be located at the top or at the bottom or laterally. An inlet slot and an outlet slot can be provided as in the modifications illustrated in Figs. 14 and 15.

If it is necessary to cool the flexible conductors, it is easy to provide for the ventilation of the same. Means can always be provided in order that the intensity of the current should not be too high therein.

The machine according to the invention can be very well adapted to the heat treatment of bars and tubes. The temperature can be raised very rapidly or slowly, at will. The nature of the current used may depend on the mode of treatment desired. The cylinder can be easily rendered fluid-tight if the treatment is to be effected in a controlled atmosphere. If a rapid heating up and cooling are desired, it may be advantageous to do away with the heat insulating refractory material of the cylinder and to increase to the maximum the cooling of the machine.

The rings of brushes are not necessarily in contact with the outer surface of the main cylinder: The refractory material inside the cylinder can be partly or even completely done away with and the brushes can be caused to press on the inner surface of the cylinder. The cylinder having been well cooled as just stated, provisions can be made for keeping its inner surface clean and polished, especially if it is covered with a suitable metallic coating. In these conditions the contacts between the brushes and the cylinders remain good. Moreover, the loss by radiation, always small owing to the rapidity of the heating is not appreciably different from what it is in the case of external brushes with refractory material lining the cylinder.

The arrangement of the brushes inside the cylinder can be adopted for both electrodes, but it seems to be particularly advantageous on the side of the movable electrode.

Fig. 21 gives an example of the way in which this arrangement can be carried out. It is assumed that the pressure of the brushes 14 is produced by hydraulic pistons the cylinders of which are perforated in a ring in one piece or in a plurality of sections secured on the support 31 by a certain number of bolts taking the place of as many hydraulic cylinders done away with, but all methods of exerting pressure, of lifting and of cooling applicable to external brushes can be applied to internal brushes.

The pressure exerted by the movable electrode unit on the member to be heated p is effected by means of the hollow rod 30.

The pressure exerted by the brushes on the main cylinder 13 acting from the interior towards the exterior, it is not necessary to provide the inner hoops for the cylinder. The hoops, constituted by the framework 19 of the cylinder, are external and consequently outside the magnetic field, which constitutes an advantage.

As one of the rings of brushes is located within the main cylinder, the other can be internal or external, or its brushes can press on the edge of the cylinder 13.

This latter arrangement is illustrated in Figs. 22 and 23 for the fixed electrode. The hydraulic cylinders of the brushes 12 are perforated in the mass of a ring which can be made in several sections and secured on the support 32 by means of a certain number of bolts taking the place of as many pistons.

In Fig. 22 the overhanging arrangement of the discs 8 and 9 has been maintained.

This overhanging arrangement, which moreover is not compulsory, but which facilitates the connections to the transformer or to the mains, has been done away with in Fig. 23.

The elimination of the overhanging arrangement, in said Fig. 23, reduces the length of the two concentric cylinders one of which carries the brushes 12 and the other the elements e of the electrode.

The embodiment with internal brushes lends itself to the same modifications as those previously described and a certain number of which are illustrated in Figs. 11 to 20.

An important advantage of this arrangement of the brushes is that it appreciably reduces the longitudinal space occupied by the machine when it is intended to heat members of variable lengths.

Let, for instance $l$ be the length of the shortest member to be heated and $L$ that of the longest member:

The length of the main cylinder is approximately $L$.

In the machines comprising external brushes previously described, the length of the brush-carrying cylinders is at least $L-l$ and, when the longest member is treated, the length of the machine between the discs 8, 9 and the movable electrode is at least $L+(L-l)$.

On the contrary, in a machine provided with brushes which are arranged inside the cylinder, it will be seen that when the longest member is heated the distance between the discs 8, 9 and the movable electrode is approximately $L$.

The difference is so much the greater as $L-l$ is greater.

The utilisation for an electrode of internal brushes therefore gives in particular the following advantages relatively to external brushes:

Elimination of the hoops placed in the magnetic field;

Diminution of the length of the machine if it is intended to heat members of different lengths;

Improvement of the efficiency owing to this diminution;

Reduction of the reactive power owing to the fact that the length of the annular magnetic flux is always approximately equal to that of the member heated.

The form of construction illustrated in Figs. 22 and 23 is more particularly indicated when the cylinder 13 opens into two shells, of the type of that illustrated in Figs. 16 and 17, as then the cylinder need not have a longitudinal displacement.

If the length of the members treated varies within wide limits, the rod 30 may be sustained by one or more supports passing through one or more longitudinal slots formed in the cylinder and rigid with a slideway located outside the latter.

The control of the rod 30 can be of any type, hydraulic, pneumatic or mechanical, for instance by means of a chain as in a drawing-frame.

Another arrangement of the machine having a telescopic cylinder allows, whilst maintaining all the brushes outside the main cylinder, of obtaining the same longitudinal cumbersomeness as with internal brushes.

For that purpose, for instance one of the brush-carrying cylinders or both, can be treated as if they were to constitute with the main cylinder a telescopic unit the extended length of which would be adjusted according to that of the heated member.

If, for instance the modification of Fig. 11 is considered, instead of giving the electrode T1 approximately the same length as that of the corresponding brush-carrying cylinder, the minimum possible length can be given thereto.

Then, let $a$ be the length of the brush-carrying cylinder 10 of T1 and $l$ the length of the shortest heated member. When said member is heated, a part $a$ of the main cylinder is engaged within the brush-carrier 10.

If, then, the main cylinder of $a$ is caused to slide towards the right, the length of the member treated may be $l+a-L$ and the total length of the machine between the discs 8, 9 and electrode T2 will be approximately $L$, as in a machine with internal brushes.

A form of construction can also be devised comprising a telescopic cylinder made in a plurality of sections and provided with several rings of brushes.

Other embodiments of the machine are obtained by causing the brushes to be carried, no longer on the main cylinder, but on the bodies of the electrodes.

Figure 24:
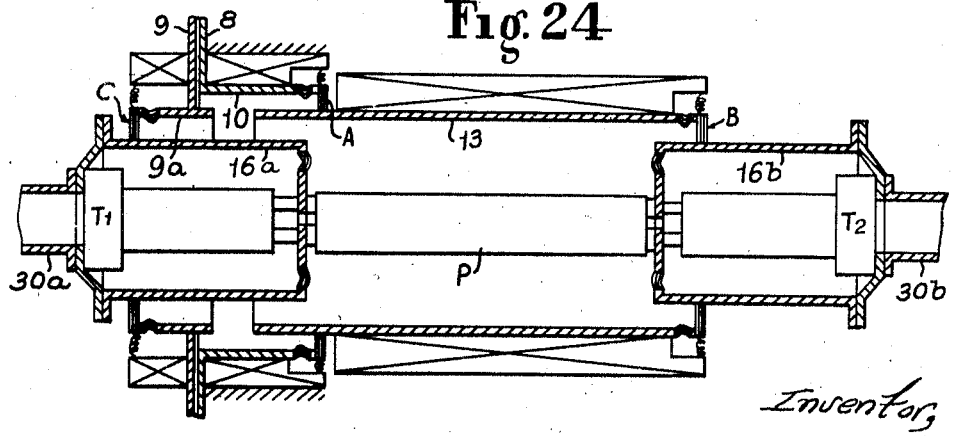
Fig. 24 is a diagrammatic axial section of another modification.

Fig. 24 of the accompanying drawings diagrammatically illustrates in section a machine thus devised.

For greater generality both electrodes are assumed to be movable.

The brushes C, which press on the cylinder 16a of T1 are connected to the disc 9 and the brushes B in contact with the cylinder 16b of T2 are connected to the main cylinder. The movement and the pressure of the electrodes take place through the rods 30a and 30b.

In said Fig. 24 the brushes A connecting the disc 8 to the main cylinder 13 have been maintained.

One or two of the groups of brushes can be eliminated, or even the three, by replacing them by rigid or flexible weldings or connections, in the same way as only one of the pressure rods 30a, 30b can be maintained.

All the modifications previously contemplated are applicable to such a machine.

Moreover, in a general manner, by considering Fig. 24, it will be seen that in any machine of this type the following connections must be ensured by rigid flexible or sliding contacts:

1. Between disc 8 and main cylinder 13;
2. Between main cylinder 13 and cylinder 16b of electrode T2;
3. Between cylinder 16a of electrode T1 and disc 9.

The first connection can be made by a group of brushes A connected to the cylinder 10 and pressing on the main cylinder 13 either internally or externally, or on its edge. This same group can be connected to the main cylinder 13 and can press against cylinder 10 either on its inner or outer surfaces, or on its edge. Or, again, the brushes A can be done away with and replaced by welding or rigid or flexible connections.

The second connection can be effected by a group of brushes B connected to the main cylinder 13 and pressing against the cylinder 16b of T2; or said brushes can be carried by T2, connected to the cylinder 16b and can make contact with the main cylinder 13 on its inner or outer surfaces or on its edge; or else the brushes B can be eliminated and replaced by weldings or rigid or flexible connections.

The third connection can be obtained by a group of brushes C connected to the cylinder 9a which follows the disc 9, carried thereby and pressing against the cylinder 16a of Tl; or the brushes C can be carried by Tl, connected to 16a and press against the cylinder 9a, internally or externally or on its edge, or else, said brushes can be eliminated and replaced by weldings or rigid or flexible connections.

By combining all these modes of connection together and with the constructional modifications previously described and some of which are illustrated in Figs. 11 to 20, without the statement made being limiting (each mode of connection can give rise to new handling devices), the creation of a large number of designs of machines will be possible among which will be chosen that which seems the best suited to the particular application contemplated.

But all these machines maintain the original and essential characteristic features mentioned.

What is claimed is:

1. In a machine for electrically heating metal bodies in the form of bars and tubes by means of intense alternating currents, the combination of two opposite co-axial electrode supports, one of which is axially stationary, means for axially moving the other support, a group of contact blocks on each of said supports and intended to be pressed against the end faces of the bar to be heated, means for axially moving said contact blocks on their respective supports, means for pressing said contact blocks against the end faces of the bar to be heated and copper conductors rigid with said contact blocks and intended to supply the electric current to said contact blocks, said conductors being constituted by elements in the form of segments forming together at least one hollow cylinder concentric with the axis of said supports.

2. A machine as claimed in claim 1, in combination with a red copper shell arranged around said electrode supports and concentric with the axis common to said supports, means for axially moving said shell relatively to said stationary support, contact brushes arranged all round said shell, an annular brush support which is axially stationary, means for radially guiding each brush in said support and means for pressing each brush against the outer periphery of said shell, means for supplying the electric current to said stationary brush support, an annular contact brush support rigid with said axially movable electrode support, radially arranged contact brushes on said last brush support, means for radially guiding said brushes and for pressing them against the outer periphery of said shell, and flexible conductors connected, on the one hand, to said axially movable annular brush support with said electrode support also movable, and on the other hand to said elements in the form of segments forming a part of said axially movable electrode support.

3. A machine as claimed in claim 1, in combination with a red copper shell arranged around said electrode supports and concentric with the axis common to said supports, means for axially moving said shell relatively to said stationary support, axially stationary contact means for supplying the electric current to said shell and contact means rigid with said axially movable electrode support and arranged to transmit the electric current from said shell to said axially movable electrode support, two contiguous annular discs arranged around said stationary electrode support, concentric with and at right angles to the axis of said support, means for electrically insulating the two discs from each other, flexible conductors for connecting one of said discs to said elements in the form of segments of said stationary electrode support and flexible conductors for connecting the other disc to said axially stationary contact means, both discs being respectively connected to the poles of a source of alternating current.

4. A machine as claimed in claim 1, in combination with a red copper shell longitudinally divided to accommodate opening thereof and arranged around said electrode supports and concentric with the axis common to said supports, means for axially moving said shell relatively to said stationary support, current conducting elements rigid with said stationary support and arranged to supply the electric current to the contact blocks of said stationary support, on the one hand, and to said shell, on the other hand, and means for transmitting the electric current from said shell to the contact blocks of said axially movable electrode support.

5. A machine as claimed in claim 1, in combination with a red copper shell arranged around said electrode supports and concentric with the axis common to said supports and in the lower wall of which is provided a longitudinal slot, means for axially moving said shell relatively to said stationary support, current conducting elements rigid with said stationary support and arranged to supply the electric current to the contact blocks of said stationary support, on the one hand, and to the shell, on the other hand, means for transmitting the electric current from said shell to the contact blocks of said axially movable electrode support, and supports for the bar to be heated, means for moving said bar supports radially relatively to said shell and for causing them to enter within said shell through said longitudinal slot.

6. A machine as claimed in claim 1, in combination with a cylindrical red copper shell composed of several tubular sections telescopically engaging one another, said shell being arranged around said electrode supports and concentric with the axis common to said supports, means for axially moving said tubular sections relatively to said stationary support, current conducting elements arranged to supply the electric current to said contact blocks of said stationary support, on the other hand, and to the nearest telescopic section of said stationary support, on the other hand, means for transmitting the current from one telescopic section to the following and means for transmitting the current from the last telescopic section to the contact blocks of said axially movable electrode support.

MARIE LOUISE NOBIRON, née GUILLON,
*Heir at Law of Henri Nobiron, Deceased.*